No. 725,187. PATENTED APR. 14, 1903.
J. P. WHITLOCK.
HAY RAKE ATTACHMENT.
APPLICATION FILED JUNE 26, 1902.
NO MODEL.
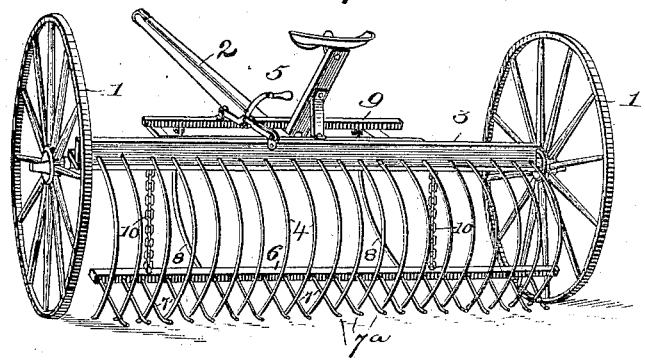
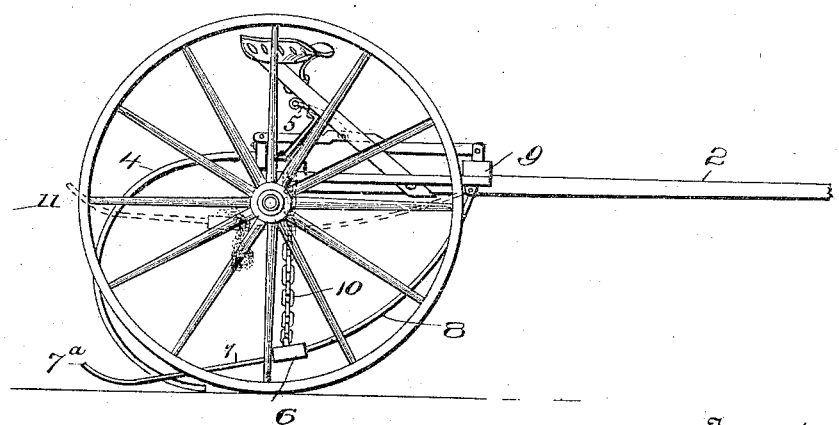
Witnesses
Inventor
John P. Whitlock

UNITED STATES PATENT OFFICE.

JOHN P. WHITLOCK, OF EPHRATAH, NEW YORK.

HAY-RAKE ATTACHMENT.

SPECIFICATION forming part of Letters Patent No. 725,187, dated April 14, 1903.

Application filed June 26, 1902. Serial No. 113,325. (No model.)

*To all whom it may concern:*

Be it known that I, JOHN P. WHITLOCK, a citizen of the United States, residing at Ephratah, in the county of Fulton and State of New York, have invented certain new and useful Improvements in Hay-Rake Attachments; and I do hereby declare the following to be a full, clear, and exact description of the invention, such as will enable others skilled in the art to which it appertains to make and use the same.

My invention relates to certain new and useful improvements in field-rakes for raking hay or the like; and it consists of certain novel features of combination and construction of parts deemed necessary to provide an attachment for an ordinary hay-rake, which will make the rake more perfect and complete in its operation.

The prime object of my invention is to insure that the hay will be reliably gathered by the teeth of the rake, even though the quantity of hay is meager, the special object being to insure that the hay will not roll upon the ground, and thus have a tendency to escape at each end of the rake and be engaged by the wheels and scattered along the path of the wheels.

Other objects and advantages will be hereinafter made clearly apparent, reference being had to the accompanying drawings, made a part of this application, and in which—

Figure 1 is a perspective view showing an ordinary hay-rake with my attachment secured in its operative position thereon ready for use. Fig. 2 is a side elevation of an ordinary hay-rake, showing my attachment in its operative position.

The various details of my invention and cooperating accessories will for convenience be referred to in detail by reference-numerals, the same numeral applying to a similar part throughout both views.

It will be understood that my invention may be applied to a hay-rake of any preferred construction, the usual form of hay-rake having the carrying-wheels 1 and the tongue 2, or said tongue may be replaced by a pair of shafts, as is common where only one horse is employed. The hay-rake as in common use is also provided with a suitable auxiliary frame or axle 3, to which are secured a plurality of rearwardly-extending curved teeth 4, the said frame-section 3 being placed under the control of the operator, whereby when the lever 5 is manipulated by him the teeth may be raised, and thereby dump or discharge the load of hay gathered by the teeth 4.

My improved attachment is designed to act as a presser-frame to bear upon the material being gathered to coöperate with this common form of construction, and with this object in view I provide the cross-bar 6, having a plurality of rearwardly-extending presser-rods 7, having upwardly-curved ends 7ª, said presser-rods being secured to the rear edge or side of the bar 6 in any preferred manner. The presser-rods 7 are relatively disposed in relation to the teeth 4, that they are designed to complement said teeth and coöperate therewith, there being a presser-rod 7 adapted to extend between each pair of teeth 4, as more clearly illustrated in Fig. 1. The bar 6 with its accompanying presser-rods provide a frame which is operatively suspended in position by means of the supporting-rods 8, which extend upward into engagement with the cross-bar 9, comprising a part of the framework of the hay-rake, the upper ends of the rods 8 being hinged to said bar 9 or otherwise pivotally connected thereto, whereby the said bar 6, with its presser-rods 7 7ª, will be left free to ride upward in contact with and parallel to the axle of the hay-rake. The downward movement of the bar 6 is limited by means of the chains 10, providing flexible supports, the upper ends of which are connected in any preferred way to the axle or frame of the hay-rake. By a proper adjustment of the chains 10 the presser-rods 7 may be held slightly above the surface of the ground, as shown in Fig. 2. When the parts are relatively disposed, as shown in Fig. 2, the hay-rake is drawn over the ground in the usual manner, and the teeth 4 will gather the hay from the surface of the ground, and as the quantity thereof accumulates the bar 6 and its accompanying plurality of presser-rods 7 7ª will be raised by the increasing quantity gathered and be supported thereon, the weight of the bar 6 and the presser-rods 7 7ª being sufficient to prevent the hay from rolling over and over, as is common, and holding it in a massed quantity until a sufficient amount has been gathered to force the bar 6 upward contiguous to the axle or frame of the machine, when a proper movement of the controlling-lever 5 will insure that the teeth 4 will be elevated and the load discharged, forming a windrow, as is common. When the teeth 4 have accumulated a full load, the supporting-rods 8, bar 6, and presser-rods 7 7ᵃ will be in the position substantially as shown by the dotted lines 11 in Fig. 2.

The hay to be gathered is sometimes very short in length or may consist of light fluffy particles of grass-blades which have a tendency to sift through between the teeth 4 or to roll over and over and escape in large quantities at each end of the series of gathering-teeth, whereas with the use of my invention such particles of light and short blades will be firmly grasped by reason of the weight of the presser-rods 7 7ᵃ and the bar 6 and its presser-rods 7 7ᵃ and reliably held until a sufficient quantity has been accumulated to raise the bar 6 to the desired height or until it is desirable to discharge the load by elevating the teeth 4. It will be understood that the parts of my invention may be very cheaply manufactured and applied to use in any preferred way, any suitable means to connect the attachment to the hay-rake being employed as will best suit the requirements of each particular case.

My attachment may be made in quantities and sold as an attachment for an ordinary hay-rake as now manufactured, it being understood that the only work necessary to place the attachment in its operative position is to connect the free ends of the rods 8 and the chain 10 to proper places or parts of the framework.

Believing that the construction and manner of using my improved attachment for hay-rakes or the like have thus been made fully apparent from the foregoing specification, further reference is deemed unnecessary.

Having thus fully described my attachment for hay-rakes, what I claim as new, and desire to secure by Letters Patent, is—

A horse hay-rake comprising a frame, gathering-teeth secured to the frame, a cross-bar having a plurality of rearwardly-extending presser-rods, the supporting-rods secured to the cross-bar at their inner ends and pivoted to the frame at their outer ends and flexible connections whereby the presser-rods are supported from the frame and rest normally near the ground while the rake-teeth are in operative position said connections permitting the rods to freely rise with the material being gathered.

In testimony whereof I affix my signature in presence of two witnesses.

JOHN P. WHITLOCK.

Witnesses:
LESTER M. WELLER,
HARRY G. WELLER.